(12) United States Patent
Bowman

(10) Patent No.: US 8,786,462 B2
(45) Date of Patent: Jul. 22, 2014

(54) ENVIRONMENTAL MONITOR

(75) Inventor: Paul A Bowman, Woodbridge (GB)

(73) Assignee: British Telecommunications plc, London (GB)

( * ) Notice: Subject to any disclaimer, the term of this patent is extended or adjusted under 35 U.S.C. 154(b) by 1057 days.

(21) Appl. No.: 12/375,423

(22) PCT Filed: Jul. 18, 2007

(86) PCT No.: PCT/GB2007/002693
§ 371 (c)(1),
(2), (4) Date: Jan. 28, 2009

(87) PCT Pub. No.: WO2008/020154
PCT Pub. Date: Feb. 21, 2008

(65) Prior Publication Data
US 2009/0261950 A1    Oct. 22, 2009

(30) Foreign Application Priority Data
Aug. 18, 2006  (EP) ..................................... 06254356

(51) Int. Cl.
G08B 23/00    (2006.01)
H04Q 9/00    (2006.01)

(52) U.S. Cl.
CPC ....................................... H04Q 9/00 (2013.01)
USPC ..................................................... 340/870.02

(58) Field of Classification Search
CPC ................................ G08B 23/00; G08C 15/06
USPC .................. 340/572.1, 588, 870.02
See application file for complete search history.

(56) References Cited

U.S. PATENT DOCUMENTS

| | | | | |
|---|---|---|---|---|
| 5,280,398 A | * | 1/1994 | Wade et al. | 360/60 |
| 5,448,220 A | * | 9/1995 | Levy | 340/539.26 |
| 5,686,888 A | * | 11/1997 | Welles et al. | 340/539.13 |
| 5,798,694 A | * | 8/1998 | Reber et al. | 340/540 |
| 5,835,012 A | * | 11/1998 | Wilk | 340/539.26 |
| 5,936,523 A | * | 8/1999 | West | 340/545.6 |
| 5,942,991 A | * | 8/1999 | Gaudreau et al. | 340/870.16 |
| 6,453,266 B1 | | 9/2002 | Chainer et al. | |
| 6,453,687 B2 | * | 9/2002 | Sharood et al. | 62/127 |

(Continued)

FOREIGN PATENT DOCUMENTS

| | | |
|---|---|---|
| DE | 203 16 326 | 2/2004 |
| EP | 0 748 083 | 12/1996 |

OTHER PUBLICATIONS

International Search Report for PCT/GB2007/002693 mailed Dec. 4, 2007.

*Primary Examiner* — Rexford Barnie
*Assistant Examiner* — Joseph Inge
(74) *Attorney, Agent, or Firm* — Nixon & Vanderhye PC

(57) ABSTRACT

A battery powered remote control unit or other ancillary device is shipped in the same packaging as the main product and is subject to similar environmental conditions throughout the supply chain. The remote control unit is fitted with an environmental sensor to detect such conditions during transit, when the main product has no power supply and stores the data. When the main product is first powered up and used, the remote control communicates to the product and relays data captured by the handset. This data, together with data collected by the main device when in use, using its own sensor, is stored to be retrieved subsequently by a reader to identify events that may have caused a fault in the device.

28 Claims, 9 Drawing Sheets

(56) References Cited

U.S. PATENT DOCUMENTS

| | | |
|---|---|---|
| 6,712,276 B1 * | 3/2004 | Abali et al. .................... 235/492 |
| 6,919,803 B2 * | 7/2005 | Breed ....................... 340/539.14 |
| RE38,985 E * | 2/2006 | Boatman et al. .............. 700/276 |
| 7,135,976 B2 * | 11/2006 | Neff et al. ................... 340/572.1 |
| 7,489,246 B2 * | 2/2009 | Himberger et al. ......... 340/572.1 |
| 7,760,084 B2 * | 7/2010 | Jensen et al. ............. 340/539.26 |
| 8,013,744 B2 * | 9/2011 | Tsai et al. ................... 340/572.8 |
| 2004/0186691 A1 * | 9/2004 | LeBlanc et al. ................ 702/187 |
| 2005/0052284 A1 * | 3/2005 | Schmidtberg et al. ......... 340/588 |
| 2007/0188321 A1 * | 8/2007 | Stenlund ................... 340/539.26 |
| 2007/0229250 A1 * | 10/2007 | Recker et al. ................. 340/531 |

\* cited by examiner

ENVIRONMENTAL MONITOR

This application is the U.S. national phase of International Application No. PCT/GB2007/002693 filed 18 Jul. 2007 which designated the U.S. and claims priority to European Patent Application No. 06254356.6 filed 18 Aug. 2006, the entire contents of each of which are hereby incorporated by reference.

TECHNICAL FIELD

This invention relates to environmental sensors, and in particular to sensors for monitoring the conditions to which goods in transit are subjected.

RELATED ART

It would be useful, in determining the cause of an equipment fault, to determine the conditions to which such equipment has been subjected, such as extremes of temperature, violent shocks, water ingress, etc. Tracking the location of the device may also be useful, for example by recording when the device has been in the vicinity of a radio beacon. For electrical devices such as computers, televisions and other entertainment equipment, such information is relatively straightforward to collect whilst the equipment is in use, as the equipment requires connection to a power supply to function. However, such devices have no internal power supply, and therefore, before installation, collection of such data is not so easy. Some devices have an internal battery to power a clock or memory, but this is normally not charged up before installation, to avoid damage should an electrical fault develop in transit. It is therefore difficult to record what happens to the equipment whilst it is being delivered. Consequently, if equipment is found to be faulty after installation, it can be difficult to ascertain whether there is a manufacturing fault, or whether the fault arose in transit to the end user, or whether the fault developed after installation, for example through mis-use.

It is common practice to fit RFID (Radio Frequency IDentification) tags to goods of high value, for stocktaking purposes and in order to track their progress from manufacture to end user and, subsequently, whilst in use. RFID tags may be applied to the completed equipment or to significant components, in order to allow their origins to be traced. For example, when troubleshooting a device, the batches from which individual components were sourced may be significant.

The RFID tag, in its simplest form, is a passive device which responds to a radio signal by returning an electronic product code, getting the power to do so from the incoming signal. In this simplest form, there is no built-in power supply. However, more complex devices also return data stored in an associated memory, for example an environmental monitor to record the conditions to which the RFID tag, and hence the equipment with which it is associated, have been subjected. This requires a power supply to collect and maintain the data.

The de facto standard for low power wireless sensor networks is the IEEE specification 802.15.4. This is implemented in various configurations such as that developed by the "Zigbee" alliance (www.zigbee.org), or the Zensys's "Z-wave" open standard (www.z-wavealliance.org).

Many electrical products are packaged with battery-operated auxiliary equipment designed to communicate with the main device, such as a remote control for a television, or a wireless computer mouse. Although it is not a universal practice, the necessary batteries themselves are usually also supplied. The batteries are not usually installed in the device at the factory, but instead are contained separately within the packaging, to avoid premature drainage of the batteries. Other electrical products, such as mobile telephones, video cameras, etc have rechargeable battery packs. As these auxiliaries are generally shipped in the same packaging as the main product, they are subjected to similar environmental conditions throughout the supply chain. Therefore, any environmental extremes, mishandling, or other events to which the main device is subjected also befalls anything else contained in the same package. However, subsequent to delivery and unpacking, an environmental sensor contained in auxiliary equipment would be of limited use as a surrogate for the main equipment. The user may decide not to use the auxiliary device at all, if alternatives are available—for example if the user prefers to use a trackerball instead of a mouse, or a mains adapter instead of the battery pack. Even if the user does use the auxiliary device, once they have been removed from the packaging the main and auxiliary devices are no longer necessarily subject to the same conditions, and it may be necessary to replace the auxiliary device if it is lost or damaged.

BRIEF SUMMARY

In a first aspect, the exemplary embodiment provides a device having means for collecting and recording environmental data, the device having an active state in which it collects such data and a dormant state in which it does not collect such data, the device being equipped to transmit a signal to an ancillary element when it goes from the dormant state to the active state, and means for collecting and storing data transmitted by the ancillary element which has been collected by the ancillary element while the device was in the dormant state.

In another aspect, the exemplary embodiment also provides the ancillary element referred to above, being a battery-operated wireless remote control device, having control means for generating control instructions for a controlled device, and means for collecting and recording environmental data, the device having means for transmitting data it has recorded to a co-operating device in response to a prompt.

The device that co-operates with the remote control to collect data may be the same device as the one controlled by its remote control function, or it may be a separate scanning device. The prompt may be a response to an initial manual input to the remote control unit.

In another aspect, the exemplary embodiment provides co-operating first and second devices, both having means for recording environmental data, the first device having means for receiving and storing data transmitted by the second device, the second device having means for collecting environmental data, and means for transmitting the data it has collected to the first device in response to a prompt.

In this aspect, the second device may be a separate battery container having no other function than as a sensor. In such a case the batteries may be removed by the user once the download has taken place (being designed in such a way that the release of the batteries is not possible until the download has been performed) and installed in a standard wireless remote control device for controlling the main product, such as a computer mouse. Alternatively, the sensor may be integral with the battery itself, the download taking place when the device containing the battery and sensor is coupled to the main device.

In a preferred arrangement, the second device may function as a battery-operated wireless controller for controlling the first device. In order to avoid inadvertent operation of the wireless controls until required, the second device may have means for disabling this function until required. Therefore, when the main product is first powered up and used, the wireless control communicates with the product and can relay data it has captured. Such data can then be stored in the main device, together with data it has itself collected after activation, to give a complete history of the device, both before and after activation. The means in the second device for collecting and recording environmental data may be disabled and/or removed from the device after the data has been transferred, and means may be provided to prevent such disabling or removal taking place before the data transfer. Alternatively, means may be provided to indicate, for example by "flagging" the data, whether it was collected by the ancillary unit before or after the initial activation.

If the first device has an internal power supply which is activated when it is first connected to an external supply, the first device may remain in the active state if subsequently disconnected from the external supply.

The first device may also be equipped to collect such data when in the active state, but not when in the dormant state.

The exemplary embodiment also extends to a method of transferring data to a first device from a second device, wherein the second device collects and records environmental data and subsequently responds to a prompt by transmitting the data it has recorded to the first device, where it is stored.

In this specification, the term "environmental data" extends to data relating to any condition to which the devices are subjected, including but not limited to temperature, physical shock, contamination and location. Contamination, e.g. by water, may be detected by electrical overloads in the equipment. Location may be determined by interaction with beacons, or RFID tag readers, used for inventory control purposes in the supply chain, and track-and-trace capabilities.

BRIEF DESCRIPTION OF THE DRAWINGS

Some exemplary embodiments of the invention will now be described by way of example, with reference to the attached schematic drawings, in which.

DETAILED DESCRIPTION OF EXEMPLARY EMBODIMENTS

Figure 1:
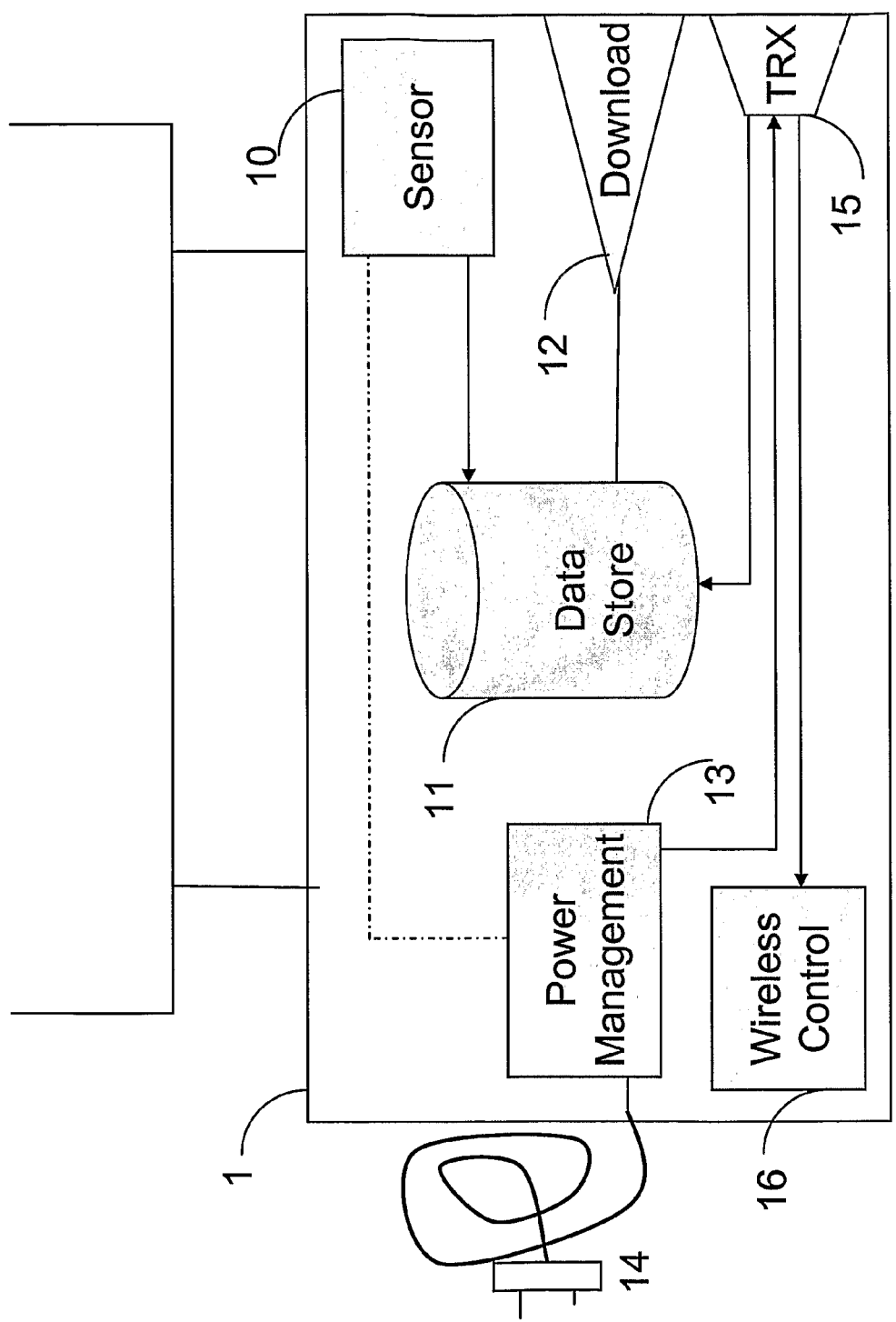
FIG. 1 depicts a first electrical product.

FIG. 1 is a schematic diagram of a first electrical product 1, for example a desktop computer. The product is provided with an RFID tag 12 or the like, for reading by a scanner 42 (as will be discussed with reference to FIG. 4) for stock control and tracking purposes. The tag 12 can also be used to identify a product, or components of the product, in the event of the device being returned to the supplier to rectify a fault: for example to identify the batch of devices from which it came.

The tag 12 is also arranged to retrieve data from a store 11 recording information detected by a sensor 10 in the device 1 about the use to which the device has been put, or the conditions to which the device has been subjected. Such data may include, for example, location information (received from beacons), electrical overloads, chemical damage; or accelerometers to detect physical shocks. Such data may be of use in determining the cause of a fault in the device 1.

Such sensors 10 and data stores 11 generally require a power supply. If the product 1 is designed to take power from a connection 14 to an external power supply, the sensor 10 cannot operate unless the device 1 is connected to the power supply. Consequently, the device 1 is unable to record data relating to its environment prior to installation. (Some devices of this kind have a standby internal power supply to retain settings during brief interruptions of power, but these can only provide power for a short term, and are not usually charged up until installation, to avoid potential damage to the equipment 1 during transit).

Figure 2:
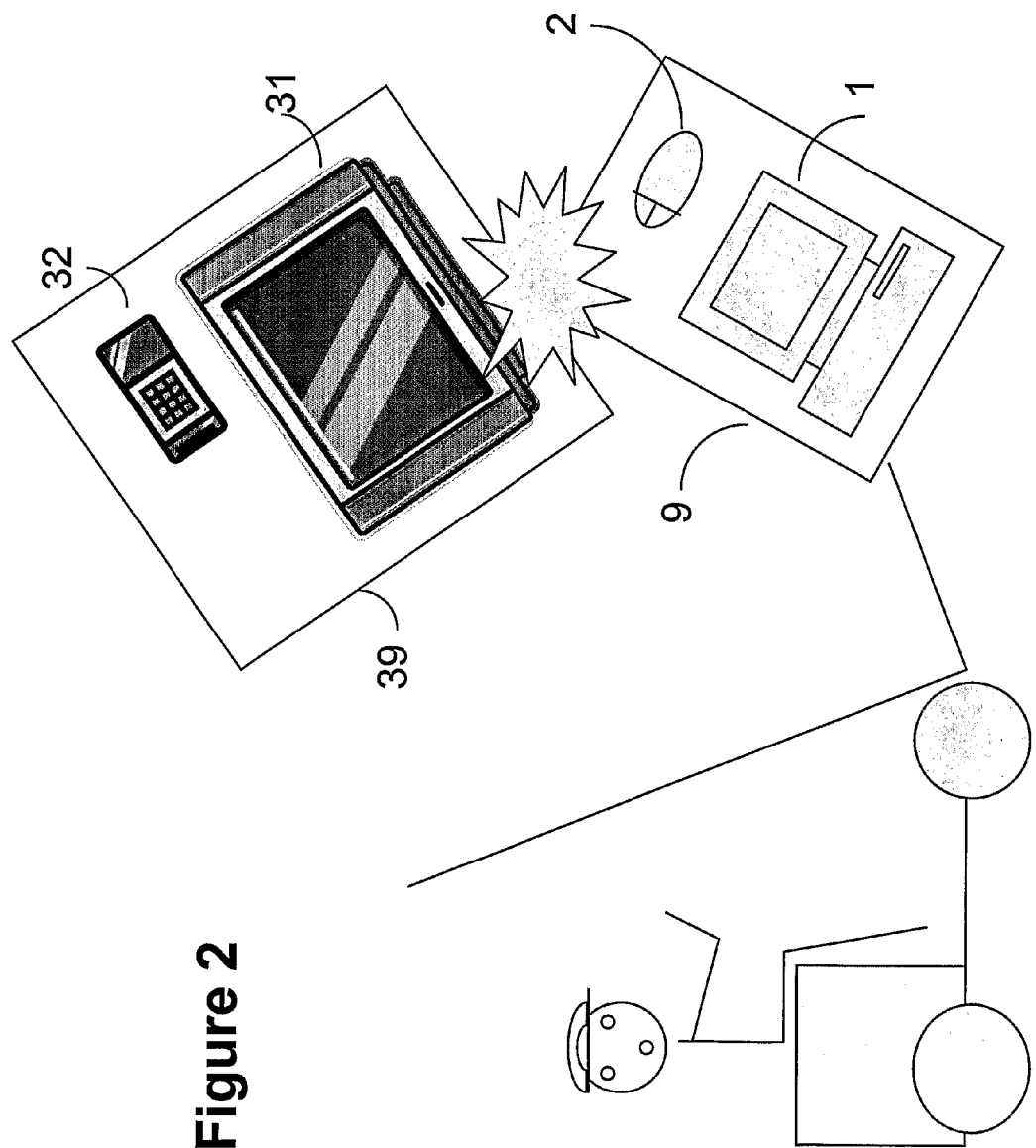
FIG. 2 depicts two such products, together with their packaging for transit.

FIG. 2 illustrates the product 1 in transit. For illustrative purposes, a second product 31, represented as a television set, is also depicted. Both products 1, 31 are enclosed in respective packaging 9, 39. It is common for such products to be packaged with ancillary devices. For example, computers are supplied with output devices such as monitor screens and loudspeakers, and data entry input devices such as keyboards. Television sets are usually supplied with remote control units. Some of these ancillary devices co-operate with the main device using a wireless connection: for example, in FIG. 2, there is shown a wireless data entry device ("mouse") 2 and a wireless television remote control device 32. Being designed to be hand-held and wire-less, such devices require their own internal power supply.

Figure 3:
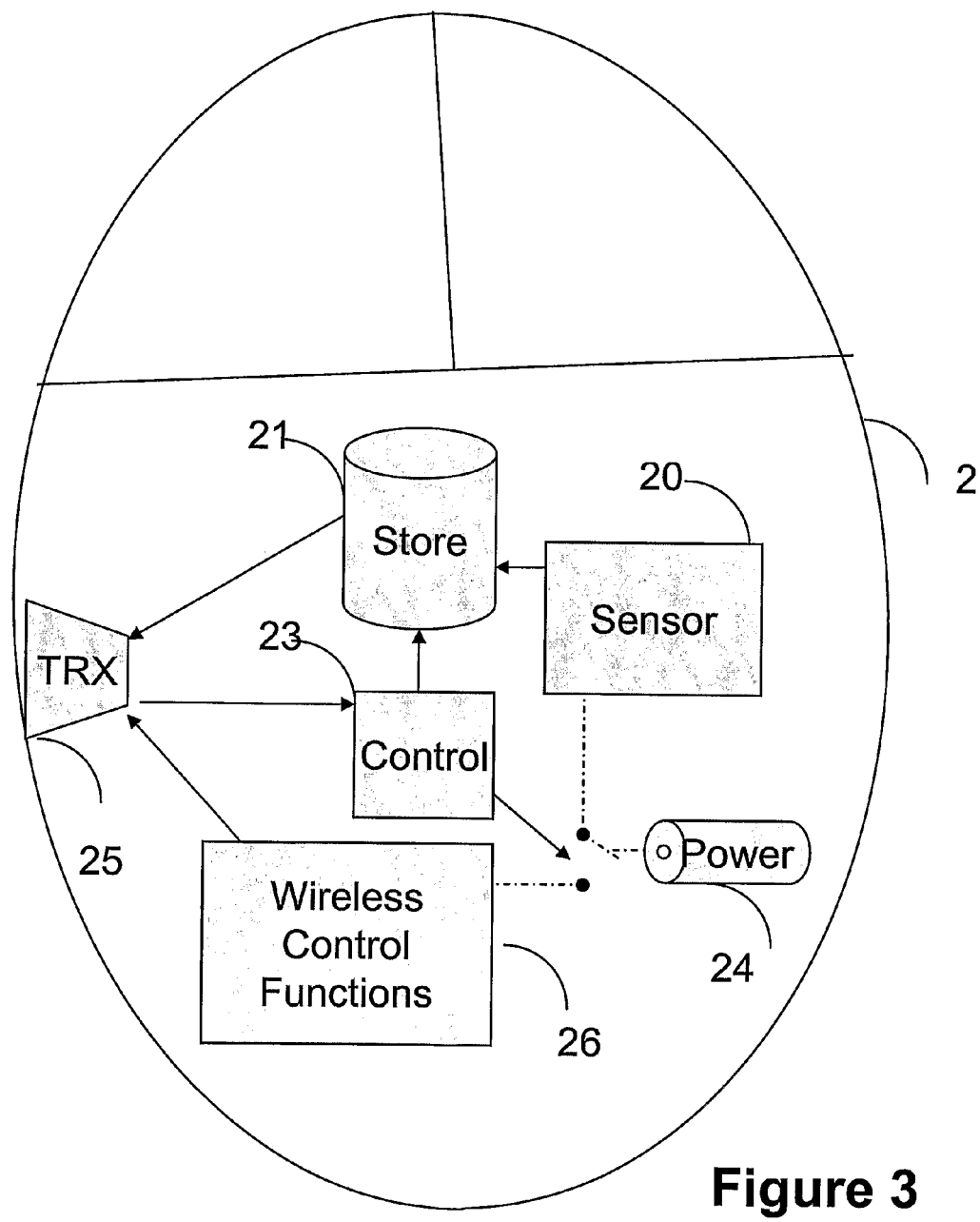
FIG. 3 depicts an auxiliary device supplied with the first electrical product.

FIG. 3 depicts a wireless data entry device 2 according to the exemplary embodiment. An internal power supply 24 normally powers the wireless control functions 26 which are transmitted using a wireless link 25 (e.g. electromagnetic (radio frequency or infra red) or acoustic) to a receiver 15 in the main device 1, to control functions 16 in the main device. While in transit, this function is normally disabled to avoid power drain. It is usual practice to disable the device 2 by packaging the batteries separately. However, as will become apparent, in the present embodiment, there is a requirement for a small amount of power during transit and so the batteries 24 are installed, but the wireless control functions 26 are disabled.

There is thus a self-powered device 2, 32 in the packaging 9, 39. During transit, this device will be subject to the same environment as the main product 1, 31, including exposure to harmful chemicals (which, for electrical products, include water), temperature extremes, and shocks. A sensor 20 installed in the ancillary device 2 will, therefore, experience the same phenomena as the main device 1.

Figure 4:
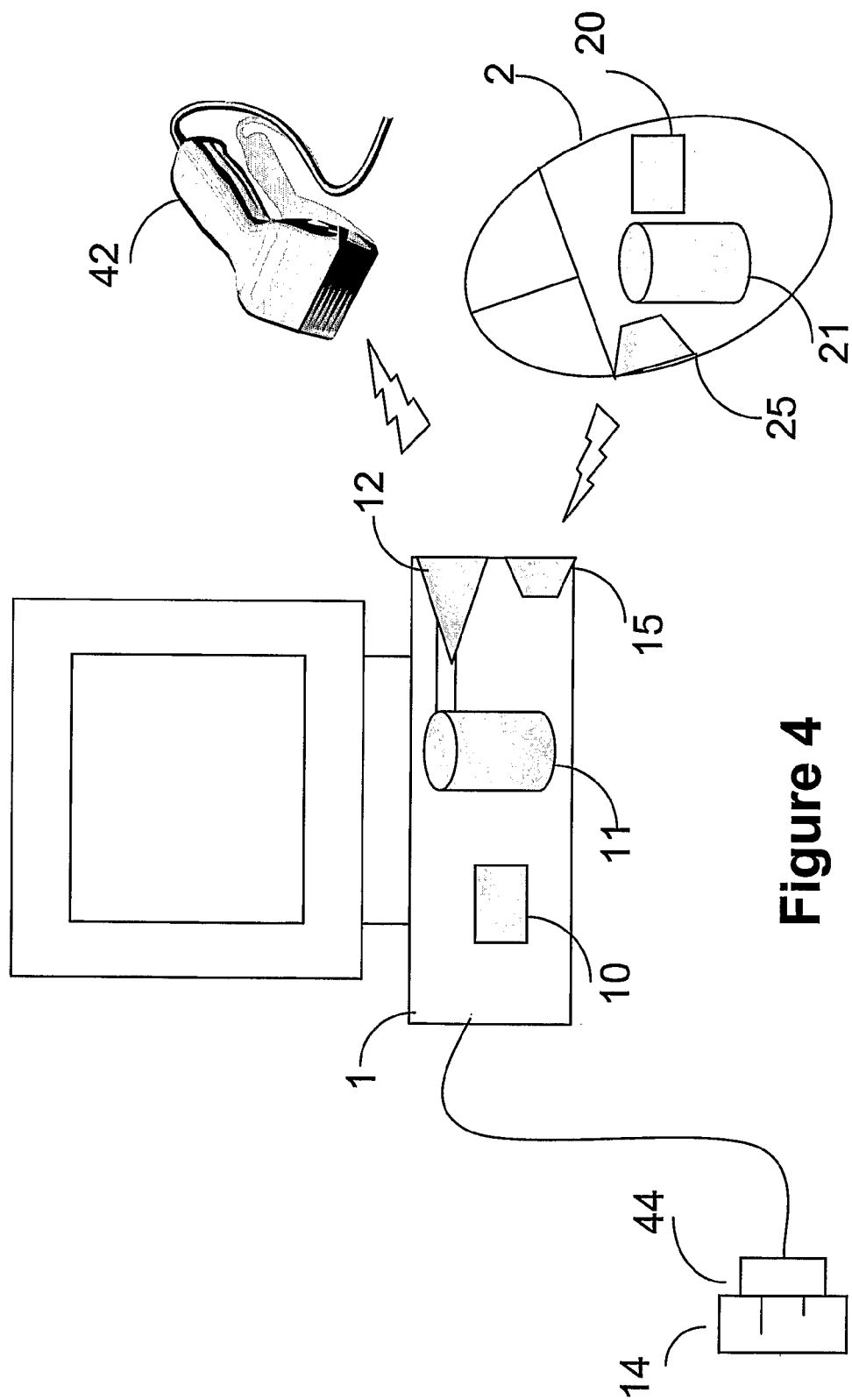
FIG. 4 depicts the first product and auxiliary device in use.
Figure 5:
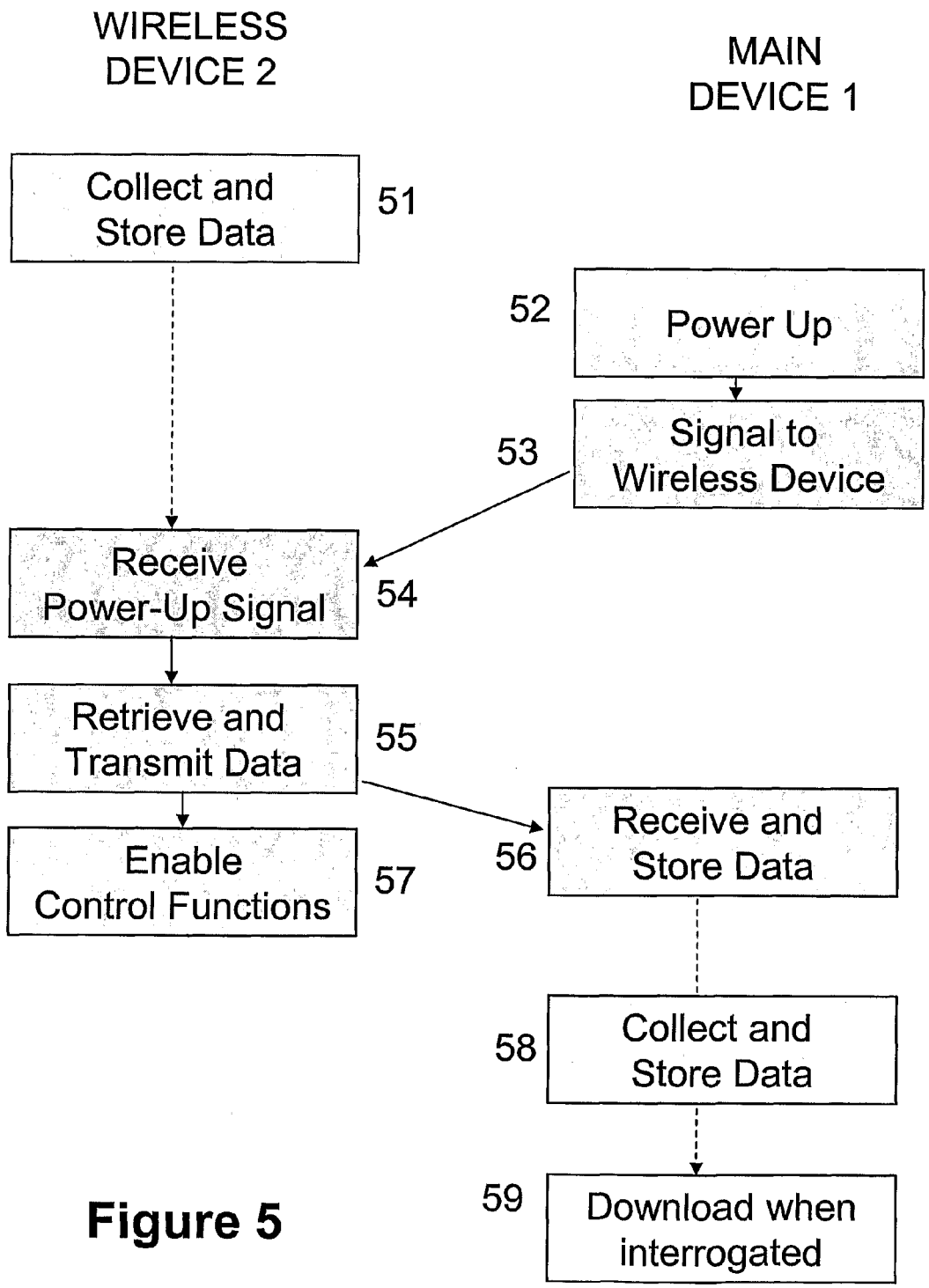
FIG. 5 is a flow diagram illustrating the processes performed by the first device and auxiliary device.

The operation of the product 1 and ancillary device 2 according to the exemplary embodiment is depicted in the flow diagram of FIG. 5. During transit, data are detected by the sensor 20 and stored in a data store 21 (step 51). When the main device 1 and ancillary device 2 are delivered to the end-user, they are removed from their packaging 9, and the power lead 14 of the main device is connected to a power supply 44 (step 52: see also FIG. 4). The sensor 10 in the main device 1 can now monitor events that occur to the main device 1, and store them in its associated store 11.

From the time when the devices 1, 2 are removed from their packaging, the sensor in the ancillary device 2 is no longer necessarily subject to the same environment as the main device 1. The ancillary device, in particular, may be mislaid or discarded. It is thus desirable to capture the data recorded in the store 21 of the ancillary device 2 and transfer it to the store 11 in the main device 1. The store 11 will then have a complete record of the environment to which the main device 1 has been subjected, both before and after installation (power-up) 52.

In response to power-up, the main device 1 transmits a signal 53 to the ancillary device through their wireless interface 15, 25. This signal is received (54) by the controller 23 of the ancillary device 2 which responds by returning the data stored in the store 21 (55). The control 23 also enables the wireless control functions 26 (step 57), which are the primary purpose of the device 2. As shown, this is done by connecting the control functions 26 to the power supply 24. Such enablement is preferably designed to be irreversible, to avoid subsequent inadvertent disablement by the user. It may also, as shown, disable the sensor 20 to avoid unnecessary power drain.

The store 11 in the product 1 now has a complete record of the history of the sensor 20 during the period when it was in the same packaging 9 as the product 1. Subsequent events, detected by the sensor 10 in the main product, are added to the store 11 (step 58) and can be downloaded (step 59) in response to interrogation by a scanner 42 interacting with the RFID tag 12 (FIG. 4).

Figure 7:
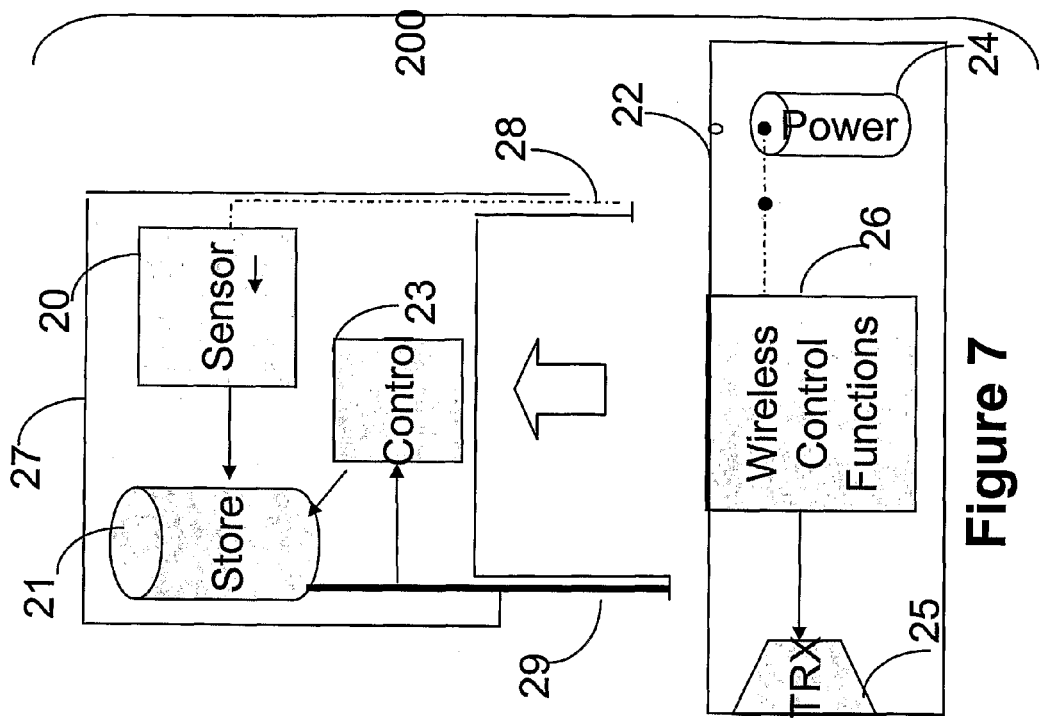
FIGS. 6 and 7 illustrate a second exemplary embodiment of the auxiliary device.
Figure 6:
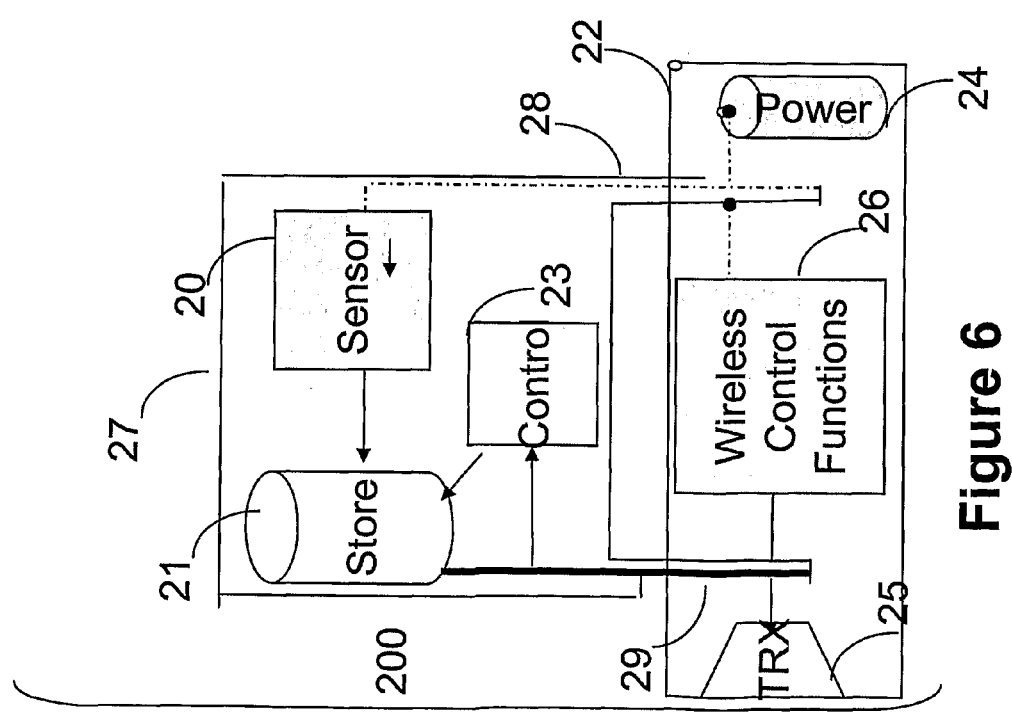

In an alternative arrangement shown in FIGS. 6 and 7, the enabling of the wireless functions (step 57) and disabling of the sensor may be performed by a user action. FIG. 6 depicts an ancillary device 200 as configured for transit, and FIG. 7 shows the same device 200 when configured for normal use. The ancillary device has a base unit 22 and a removable module 27. Elements having the same functions as the ancillary device 2 of FIG. 3 have the same reference numerals. The sensor 20, store 21 and retrieval control unit 23 are contained in the removable module 27, whilst the battery 24, transmitter 25, and wireless control functions 26, are in the base unit 22. The module 27 has a first pin 28 electrically connecting the sensor 20 in the module 27 to the power supply 24 in the base unit 22, and isolating the wireless control functions 26 in the base unit 22 from the power supply 24. The module also has a second pin 29 electrically connecting the store 21 in the module 27 to the transceiver 25 in the base unit 22, and isolating the wireless control functions 26 from the transceiver 25. After the main device 1 has powered up and the data has been downloaded from the ancillary store 21 to the main store 11, the user can remove the module 27 and discard it, the removal of the isolating pins thereby connecting the wireless control functions 26 in the base unit 22 to both the power supply 24 and the transceiver 25.

Figure 8:
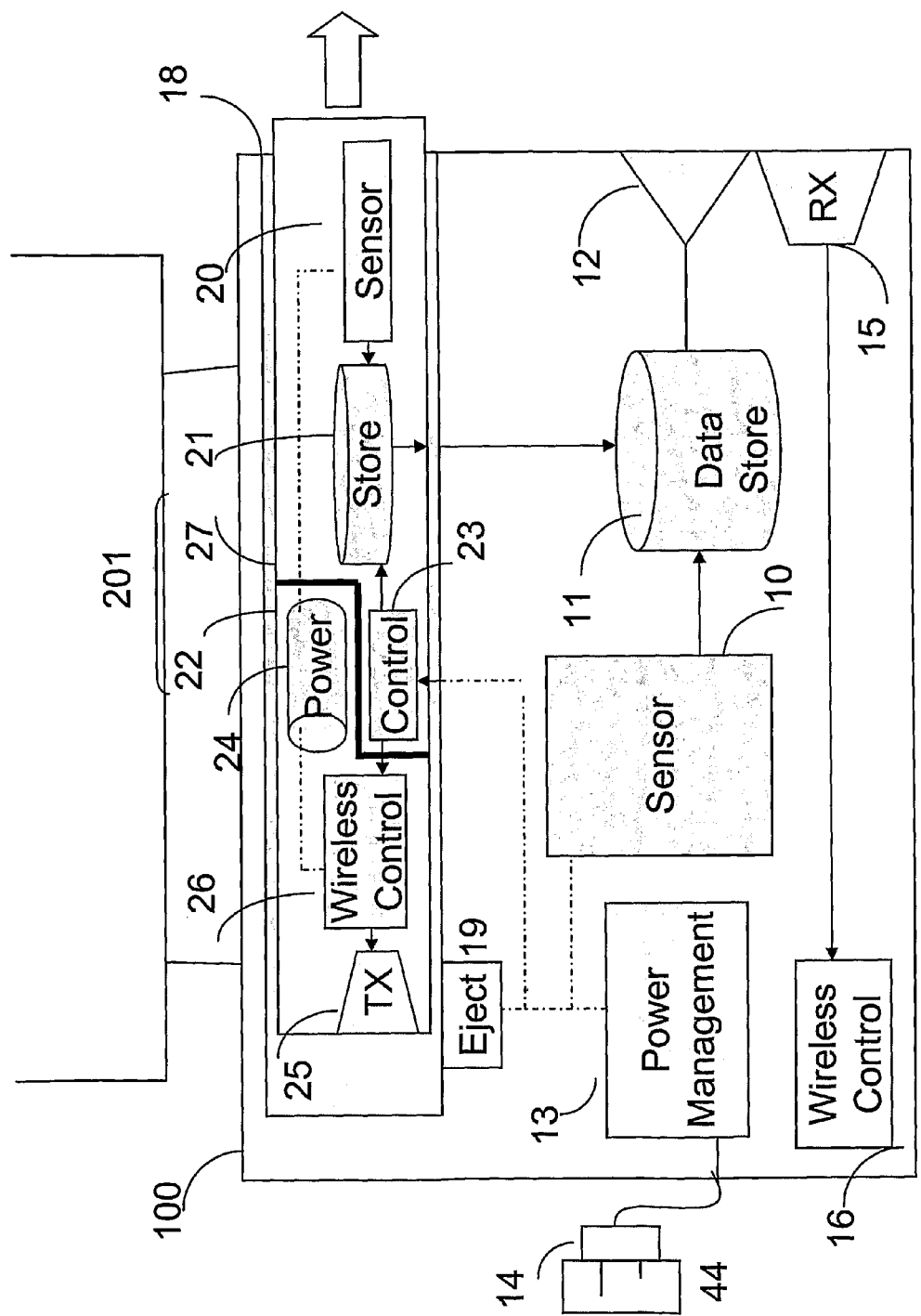
FIG. 8 depicts a third exemplary embodiment of the invention.

A third embodiment, depicted schematically in FIG. 8, has a further embodiment of the main product 100 and ancillary device 201, and is designed to prevent the user disabling the sensor 20 prematurely, before the main product 100 has powered up. In this embodiment, the ancillary device 201 is packaged within the main product 100 in such a way that it cannot be removed until the main product 100 is powered up. As is common in products such as computers and DVD players, the main product 100 has a port 18 for inserting and ejecting a data carrier such as a DVD or CD-ROM, in which the operation of the "eject" mechanism requires the product 100 to be connected to a power supply 44. In this embodiment, the ancillary device 201, made up of a base unit 22 and a removable module 27 as in the previous embodiment, is packaged at least partially within the port 18. When the main device 100 is first connected to a mains power supply 44, the control unit 23 in the ancillary, device 201 causes the store 21 to download data to the corresponding store 11 in the main device 1 (steps 55, 56: FIG. 5). The user may subsequently operate the eject mechanism 19 to retrieve the ancillary device 201, and can then detach the module 27 containing the sensor 20 and store 21, the remaining base unit 22 consequently being configured for use as a wireless controller for the main device 100 (step 57). By locating the ancillary device 201 at least partially in the port 19, such that it cannot be removed until the main device 100 is powered up, premature disabling of the download function of the store 21 can be prevented.

Figure 9:
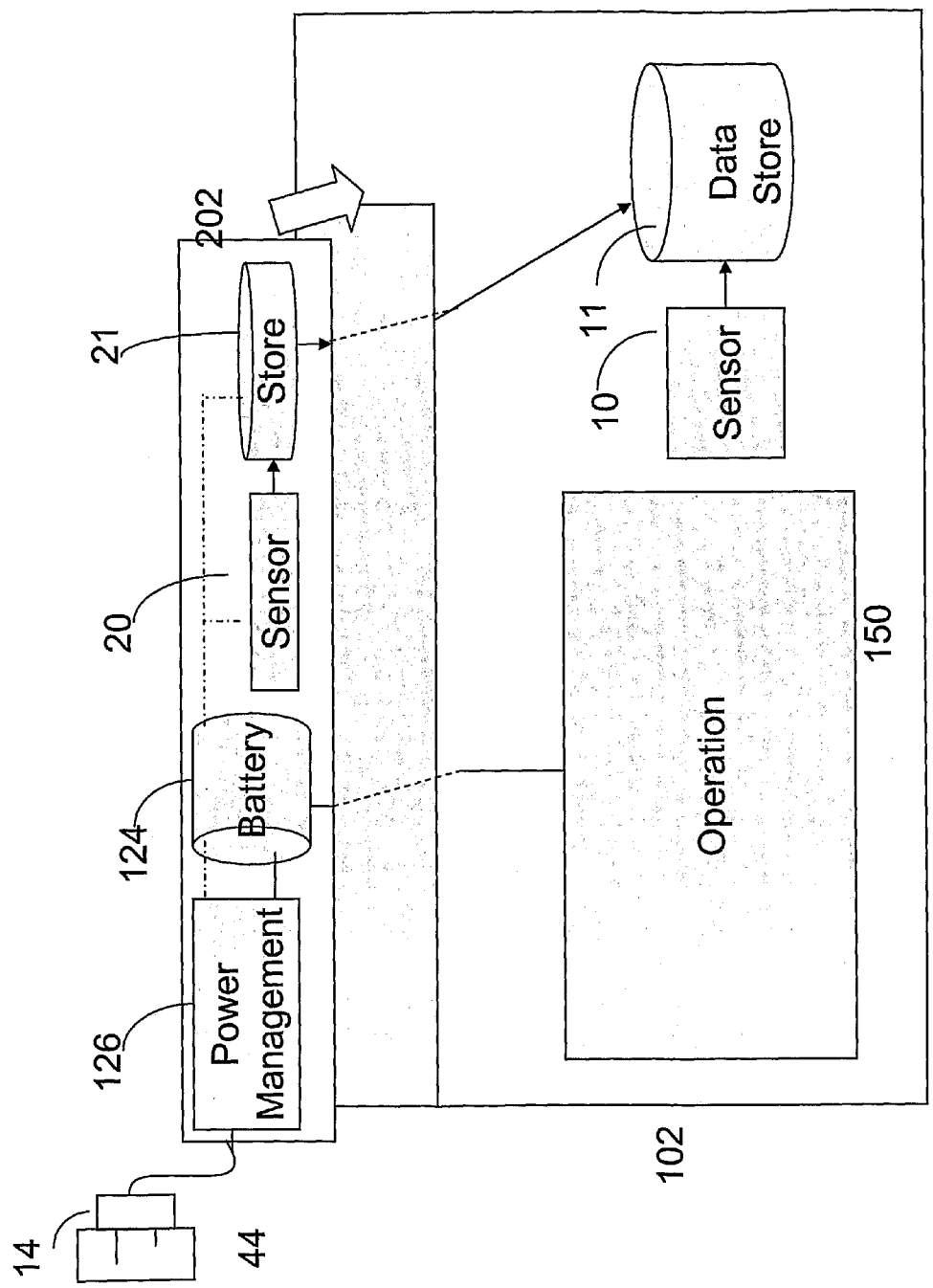
FIG. 9 depicts a fourth exemplary embodiment of the invention.

A fourth embodiment, depicted schematically in FIG. 9, has a further embodiment of the main product 102 and ancillary device 202, and is designed for situations where the ancillary device 202 provides the power supply for the main device 102—for example a battery pack for a mobile telephone, video camera, laptop computer, or other portable device. As with the previous embodiments, both the main device 102 and ancillary device 202 have respective sensors 10, 20, together with respective data stores 11, 21 for recorded data collected by the sensors. In this embodiment, the primary function 126 of the ancillary device is to manage the power supply for the primary function 150 of the main device 102 (e.g. as a communications device, camera, personal audio player etc). The power management system 126 can take power from a connection 14 with a mains power supply 44, or from an internal battery 124. The internal battery 124 can also supply power to the sensor 20. In this embodiment, the main product 100 is dormant (cannot operate) until the ancillary device 202 is connected to it, at which point the main device 102 becomes active and the store 21 in the ancillary device 202 can download data to the corresponding store 11 in the main device 102.

A number of variant processes will now be discussed, with reference to the flow diagram of FIG. 10.

Figure 10:
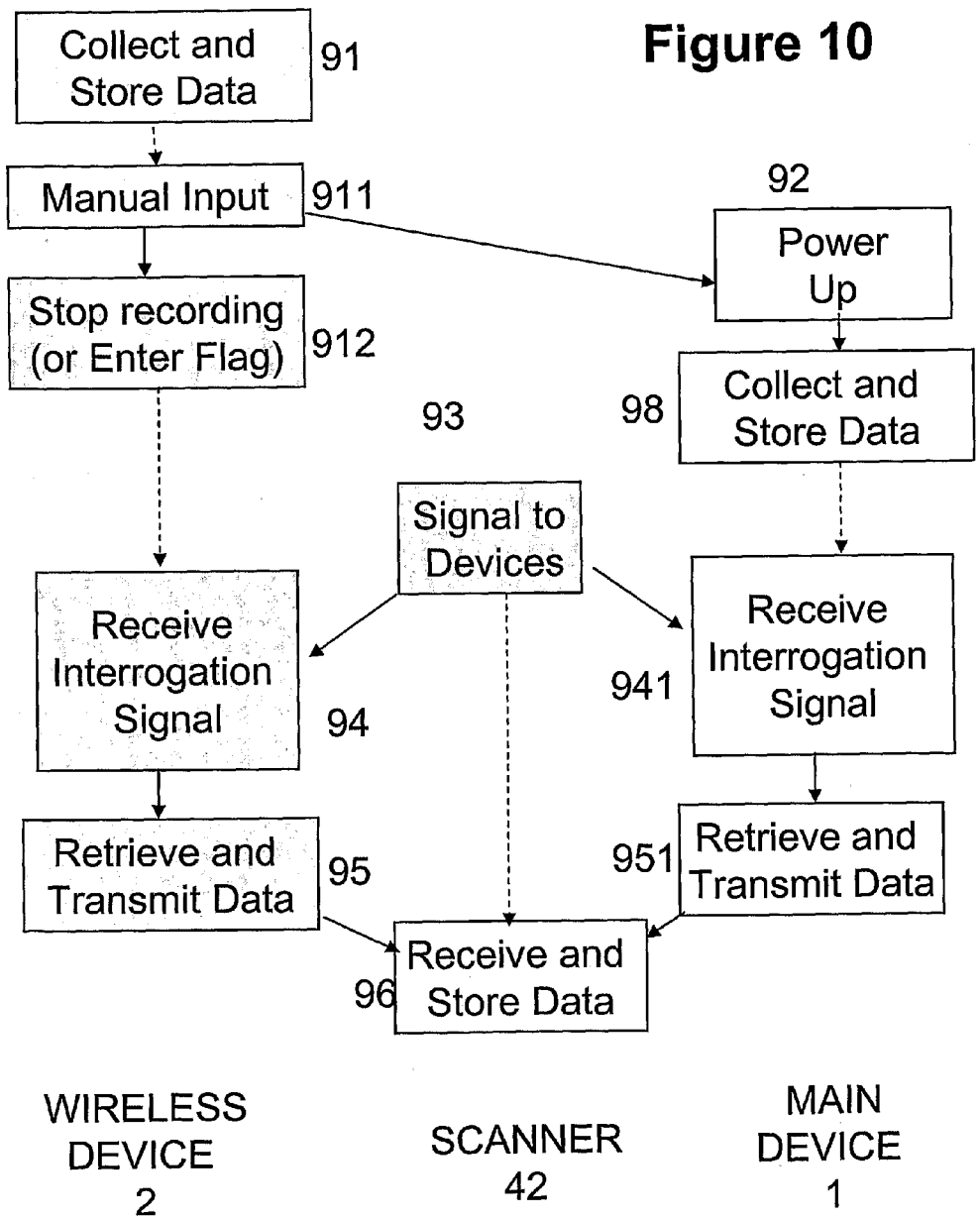
FIG. 10 is a flow diagram similar to that of FIG. 5, illustrating alternative processes according to the invention.

In the embodiment of FIG. 10, the scanning device 42 interfaces with the ancillary device 2 directly, rather than indirectly as shown in FIG. 4. As in FIG. 5, the ancillary device 2 collects and stores data (step 91) whilst it is packaged with the main device 1. The ancillary device may be arranged, as shown in FIG. 10, to stop recording such data (step 912) in response to a predetermined event (911) indicative that it has been removed from its packaging. This event 911 may be the first use of its manual controls to control the main device 1, or a specific operation to enable those controls, as discussed with reference to FIGS. 7 and 8, or the connection of the devices together, as discussed with reference to FIG. 9. From this point it may be assumed that the ancillary device 2, (200, 201, 202) having been removed from the packaging, is no longer an appropriate surrogate for the main device 1 (100, 102). The main device, having been powered up (step 92) may be able to record data for itself from this point (98), but this is not essential if it is only desired to monitor conditions up to the point of delivery to the end user.

In the event of a fault subsequently developing in the main device 1, a technician can make a site visit and use a scanning device 42 to interrogate the ancillary device 2 (step 93) and, in the preferred embodiment, the main device 1 as well. The scanner may generate a prompt 94 as shown, or the download may be initiated by a manual input to the ancillary device 2. In either case, the ancillary device 2 responds to this input 94 by retrieving and returning data 95 indicative of the history of the ancillary device 2, and hence of the main device that was traveling in the same packaging. In the preferred embodiment, the main device 1 also responds to a prompt 93 from the scanner (or a manual input, either to the main device itself or through the remote control unit 2) to generate an input 941. The main device 1 responds to this input 941 by retrieving and returning data 951 indicative of the history of the main device after it was removed from its packaging and powered up. The "before" and "after" data 95, 951 is received and collated by the scanner 42 (step 96). Note that, in this embodiment, synchronization of the data 95, 951 retrieved from the two sources 2,1 can be achieved by comparing the end of recording 912 in the ancillary device 2 with the start of recording 92 in the main device 1, as both these events are triggered by the same input 911.

In an alternative embodiment, recording does not stop on first use of the ancillary device 2, but a data flag is added to the recorded data to identify this instant 912 in the record and allow the record to be aligned with the start of recording 92 by the main device 1. If the ancillary device is arranged to continue recording after the main device has been activated, a flag may also be generated to mark each time a download is made to the scanner 42, to allow data records downloaded to the scanner on successive occasions to be synchronized with the main device 1.

What is claimed is:

1. First and second co-operating devices which are configured to be packaged and shipped together as a unit package to a user such that both devices are subjected to the same or similar environmental conditions during shipment, the second device being a detachable or separate auxiliary to a main function of the first device after shipment and delivery to a user, and both having sensors for recording their respective ambient environmental data if enabled to do so,
   the first device having a receiver and first data store for receiving and storing environmental data transmitted by the second device and a prompt generator responsive to a user-generated initial activation of the main function of the first device after delivery to the user and indicative that the devices have been detached or separated from each other for use, to generate a prompt signal to the second device,
   the second device having a second data store configured for collecting and storing environmental data during shipment, and a transmitter for transmitting the data stored in the second data store to the first device in response to a prompt generated by said user-generated initial activation of the main function of the first device;
   wherein the second device also has the capability to function as a battery operated wireless controller for the main function of the first device;
   wherein the second device has means for initially disabling the control function, and for subsequently enabling this function; and
   means in the first device for storing the second device, such that the second device is not accessible to a user to allow such enablement until the data has been transferred.

2. First and second co-operating devices according to claim 1, the first device having an active state and a dormant state,
   the first device being equipped to transmit a signal to the second device when it goes from the dormant state to the active state,
   the second device having means for detecting the said signal and, in response to detecting the signal, for transmitting data it has recorded to the first device.

3. First and second co-operating devices according to claim 2, both having means for collecting environmental data, the first device being equipped to collect such data when in the active state but not when in the dormant state.

4. First and second co-operating devices according to claim 1, wherein the second device has manual control means for generating a prompt to transmit data to the first device.

5. First and second co-operating devices according to claim 2, wherein the first device is arranged to be in a dormant state when it is not connected to a power supply and in an active state when it is connected to a power supply.

6. First and second co-operating devices according to claim 1, wherein the second device has means for transmitting an identification code to distinguish data transmitted in an initial data transmission from data transmitted subsequently, and the first device has means for storing the identification codes in association with the received data.

7. First and second co-operating devices as claimed in claim 1, configured to disable the second device from collecting and recording further environmental data after data has been once transferred to the first device, and configured so that such disabling cannot take place before the data has been transferred.

8. First and second co-operating devices as claimed in claim 7, comprising means to prevent such disabling taking place before the data is transferred.

9. First and second co-operating devices, which are configured to be packaged and shipped together as a unit package to a user such that both devices are subjected to the same or similar environmental conditions during shipment, the second device being a detachable or separate auxiliary to a main function of the first device after shipment and delivery to a user, and both having sensors for recording their respective ambient environmental data if enabled to do so,
   the first device having a receiver and first data store for receiving and storing environmental data transmitted by the second device and a prompt generator responsive to a user-generated initial activation of the main function of the first device after delivery to the user and indicative that the devices have been detached or separated from each other for use, to generate a prompt signal to the second device,
   the second device having a second data store configured for collecting and storing environmental data during shipment, and a transmitter for transmitting the data stored in the second data store to the first device in response to a prompt generated by said user-generated initial activation of the main function of the first device,
   and further comprising a detector in the first device for detecting when it is first connected to a power supply and retrieving from the second device data stored in the second device in response to the power connection.

10. First and second co-operating devices, the second device being a detachable or separate auxiliary to a main function of the first device, and both having sensors for recording environmental data,
    the first device having a receiver and data store for receiving and storing data transmitted by the second device,
    the second device having a store for collecting environmental data, and a transmitter for transmitting the data it has collected to the first device in response to a prompt generated by initialization of the main function of the first device,
    said first and second co-operating devices being configured to disable the second device from collecting and recording further environmental data after data has been once transferred to the first device, and being configured so that such disabling cannot take place before the data has been transferred,
    wherein the disabling means comprises a removable module containing the elements to be disabled.

11. First and second co-operating devices according to claim 10, the first device having an active state and a dormant state,
  the first device being equipped to transmit a signal to the second device when it goes from the dormant state to the active state,
  the second device having means for detecting the said signal and, in response to detecting the signal, for transmitting data it has recorded to the first device.

12. First and second co-operating devices according to claim 11, both having means for collecting environmental data, the first device being equipped to collect such data when in the active state but not when in the dormant state.

13. First and second co-operating devices according to claim 10, wherein the second device provides a power supply to the first device when coupled thereto.

14. First and second co-operating devices according to claim 10, wherein the second device has manual control means for generating a prompt to transmit data to the first device.

15. First and second co-operating devices according to claim 10, wherein the second device also has the capability to function as a battery-operated wireless controller for a controlled device.

16. First and second co-operating devices according to claim 10, wherein the second device also has the capability to function as a battery operated wireless controller for the main function of the first device.

17. First and second co-operating devices according to claim 12, wherein the first device is arranged to be in a dormant state when it is not connected to a power supply and in an active state when it is connected to a power supply.

18. First and second co-operating devices as claimed in claim 13, comprising a detector in the first device for detecting when it is first connected to a power supply and retrieving from the second device data stored in the second device in response to the power connection.

19. First and second co-operating devices as claimed in claim 16, wherein the second device has means for initially disabling the control function, and for subsequently enabling this function.

20. First and second co-operating devices as claimed in claim 19, comprising means in the first device for storing the second device, such that the second device is not accessible to a user to allow such enablement until the data has been transferred.

21. A method of transferring data to a first device from a second device, the second device being a detachable or separate auxiliary to the main function of the first device,
  wherein the second device collects and records environmental data and subsequently, in response to a prompt generated by initialization of the main function of the first device, transmits the data it has recorded to the first device, where it is stored,
  wherein the second device has a power supply for supplying power to the first device when coupled thereto,
  wherein after data has been transferred to the first device, the second device is disabled from collecting and recording further data, and
  wherein the elements to be disabled are contained in a removable module.

22. A method according to claim 21, wherein the first device has an active state in which it collects such data and a dormant state in which it does not collect such data, wherein the first device transmits a signal to the second device when it goes from the dormant state to the active state, the second device detects the said signal and, in response to detecting the signal, transmits the data it has recorded to the first device.

23. A method according to claim 22, wherein the first device is in the dormant state when it is not connected to a power supply and in the active state when it is connected to a power supply.

24. A method according to claim 23, wherein, in response to connection to a power supply, the first device retrieves data from the second device, and stores the data in the first device.

25. A method according to claim 22, wherein the control function is initially disabled, and is subsequently enabled when the data is transferred.

26. A method according to claim 21, wherein removal is prevented until the data is transferred.

27. A method as claimed in claim 26, wherein the second device is stored within a device to be controlled by the second device, such that the second device is not accessible to a user until the data has been transferred.

28. A method, of transferring data to a first device from a second device, said method comprising:
  packaging and shipping said first and second devices together as a unit package to a user such that both devices are subject to the same or similar environmental conditions during shipment, the second device being a detachable or separate auxiliary to the main function of the first device after delivery to a user;
  collecting and recording ambient environmental data in the second device during said shipment; and
  subsequently, in response to a prompt generated by a user-generated initial activation of the main function of the first device after delivery to a user indicating that the devices have been detached or separated from each other, transmitting the environmental data recorded by the second device to the first device and storing the environmental in the first device,
  wherein after data has been transferred to the first device, the second device is disabled from collecting and recording further data.

* * * * *